July 16, 1957   J. A. GRZYWNA ET AL   2,799,090
INTERNAL THREAD COMPARATOR
Filed Jan. 15, 1954
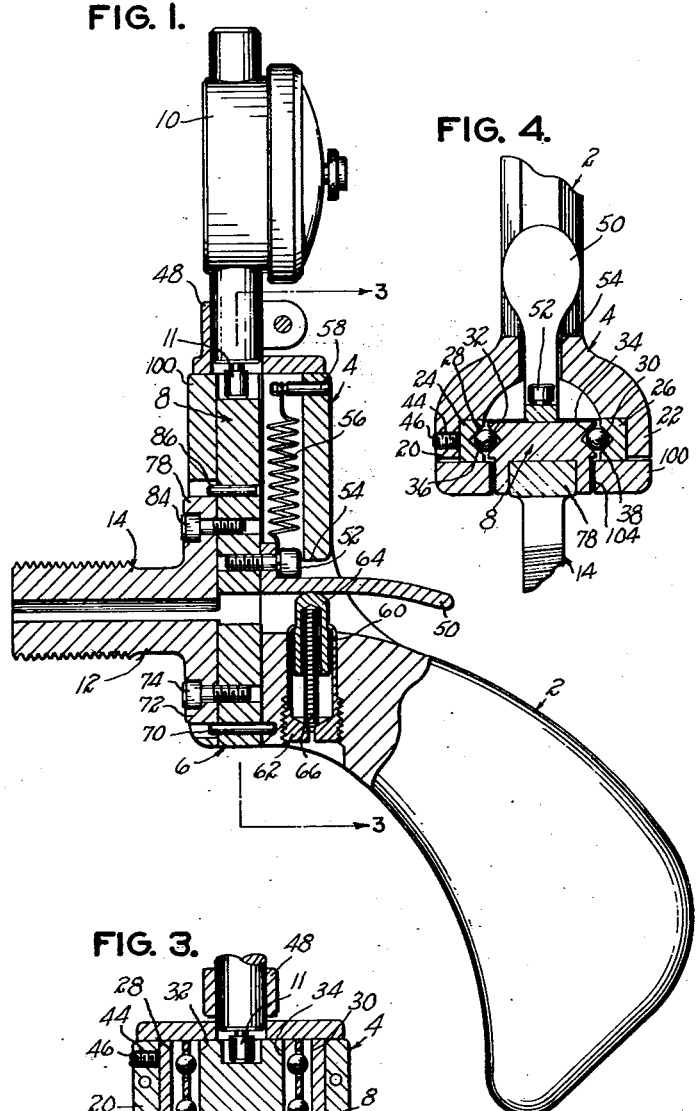
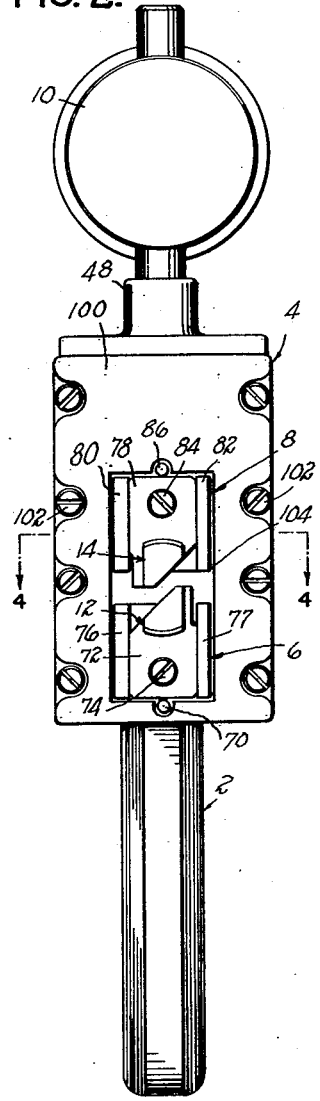
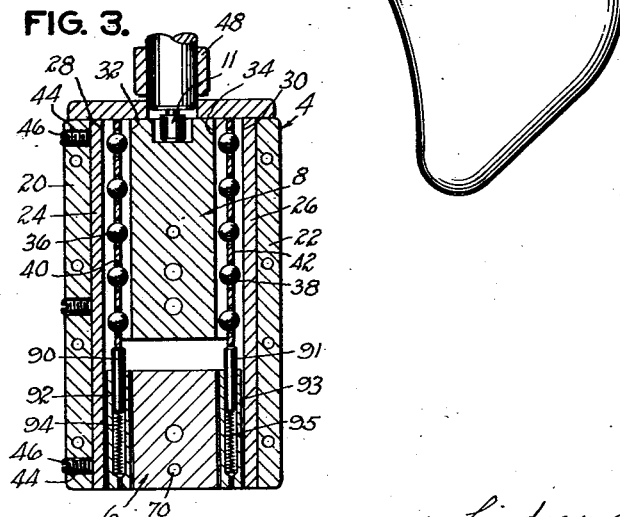
INVENTORS
JOHN A. GRZYWNA.
BROR W. SWANSON.
BY
Lindsey and Prutzman
ATTORNEYS

United States Patent Office 2,799,090
Patented July 16, 1957

2,799,090

INTERNAL THREAD COMPARATOR

John A. Grzywna and Bror W. Swanson, West Hartford, Conn., assignors to The Whitney Chain Company, Hartford, Conn., a corporation of Connecticut Application January 15, 1954, Serial No. 404,207

3 Claims. (Cl. 33—147)

The present invention relates to comparators for gauging internal threads or the like and has for its principal object to provide a comparator of improved accuracy and dependability, which is convenient and easy to use, and which is particularly suitable for ease of manufacture.

Another object is to provide a comparator which is particularly suited for holding in the hand of the user and whose gauge elements can be actuated by a simple thumb movement to permit convenient and rapid insertion into a workpiece to be gauged, and hence permits rapid inspection of successive parts with reduced fatigue of the operator.

Another object is to provide a comparator in which the gauge elements can be simply and quickly exchanged or replaced, and yet are so supported as to insure a high degree of accuracy and repeatability of readings during successive gauging operations.

Other objects will be in part obvious, and in part pointed out more in detail hereinafter.

The invention accordingly consists in the features of construction, combination of elements and arrangement of parts which will be exemplified in the construction hereafter set forth and the scope of the application of which will be indicated in the appended claims.

In the drawing:

Figure 1 is a side view of a comparator constructed in accordance with the present invention with certain portions sectionalized to show the arrangement of parts;

Figure 2 is a front view of the comparator shown in Figure 1;

Figure 3 is a sectional view of a portion of the comparator taken on the line 3—3 of Figure 1; and Figure 4 is a sectional view of the comparator taken on the line 4—4 of Figure 2.

Referring to the drawing, a comparator constructed in accordance with the present invention includes a handle 2 of the pistol-grip type from which extends an upstanding frame 4 of generally U-shaped cross section.

Within the frame 4 is an anvil 6 and a slide 8 supported for relative movement thereto. Also mounted in the frame is a dial indicator 10 having a stem 11 adapted to contact the slide 8 and indicate changes in the positions thereof. From the slide and the anvil in turn are supported a pair of gauge elements 12, 14 which are arranged to be drawn together for insertion within a test piece to be gauged and are adapted to be spring-urged apart within the test piece to measure the internal dimensions thereof in terms of the reading of the dial indicator.

Turning now to the specific structural details of the comparator, the frame 4 is open at its front side and thus provides a pair of relatively widely spaced parallel side rails 20, 22. The side rails are longitudinally slotted on their inner sides to receive a pair of long, straight, outer ball bearing race members 24, 26. The race members have V-shaped longitudinal grooves 28, 30 for accommodating ball bearings therein.

Between the outer races is disposed an oblong, relatively wide movable slide 8 having flat sides provided with V-shaped longitudinal grooves 32, 34 arranged complementary to, and opposite, the grooves 28, 30 in the outer races 24, 26. Separating and supporting the movable slide 8 from the outer races are two rows of ball bearings 36, 38 properly spaced by cage elements 40, 42 respectively. Ball bearings 36, 38 are adapted to roll in the grooves and thus serve to accurately align the movable slide 8 in frame 4 while permitting it to move freely up and down. The frame 4 is provided with a number of drilled holes 44 spaced in side rail 20 along the back side of outer race 24, and setscrews 46 threaded into these holes permit lateral adjustment of outer race 24 to vary the play between the movable slide 8 and frame 4.

At the top of the frame is a collet 48 in which is clamped the neck of a dial indicator 10. The stem 11 of dial indicator 10 extends downwardly into the frame in aligned relation with the top end of movable slide 8, and is adapted to be engaged by the movable slide during reciprocation thereof to indicate changes of position of the movable slide.

A lever or thumb piece 50 is fastened by a screw 52 directly to the back of movable slide 8 adjacent its lower end, and extends transversely out through an aperture 54 in the back side of frame 4 in generally parallel relation with the upper end of the handle 2. The movable slide is biased in an upward direction relative to handle 2 by means of a tension spring 56 attached at its upper end to a pin 58 carried by the frame and attached at its lower end to the screw 52.

Beneath thumb piece 50 the handle 2 is provided with a bore 60 aligned parallel with the direction of movement of movable slide 8. Within bore 60 is threaded a spring retainer 62 slidably supporting a pin 64 resiliently biased upwardly by a compression spring 66 into contact with thumb piece 50. The pin 64 assists in biasing thumb piece 50 and slide 8 upwardly in the frame and provides a convenient means for varying the upward spring return force on the slide 8 without necessitating disassembly of the comparator to change tension spring 56.

The upper end of handle 2 is slotted to receive an anvil 6, of oblong shape, which is supported in vertical alignment with movable slide 8. The anvil 6 is secured to handle 2 by a pin 70, one end of which protrudes from the front of anvil 6 and serves as a shoulder or stop pin for locating a gauge element 12 carried by the anvil 6. Gauge element 12 extends generally transversely outward from the flat front face of anvil 6, and has a downwardly extending foot 72 which is clamped to the anvil by a screw 74 threaded therein. The gauge element 12 is received between a pair of laterally spaced parallel shoulders or ribs 76, 77 protruding from the front of anvil 6, which serve to locate the gauge element laterally and prevent it from cocking sideways relative to the anvil. Screw 74 fits loosely in foot 72 of gauge element 12, and thus when the gauge element is being attached to the comparator, it may be vertically adjusted slightly to permit firm contact of the bottom end of foot 72 with stop pin 70 before the screw 74 is tightened down. This arrangement insures absolute accuracy of positioning of gauge element 12 on the anvil 6, regardless of tolerances in screw 74 and the screw hole in foot 72.

Movable slide 8 has a flat front face which is coplanar with the front of anvil 6. Carried by movable slide 8 is a movable gauge element 14, which extends transversely outward from the front of the slide in complementary position relative to the gauge element 12 supported from the anvil. Gauge element 14 has an upwardly extending foot 78 which is received between a pair of laterally spaced ribs 80, 82 protruding from the front of slide 8. Ribs 80, 82 thus laterally position gauge element 14 and prevent it from cocking or tilting relative to slide 8. The foot 78 is clamped to the front of slide 8 by a screw 84 which extends through a hole in foot 78 with a loose fit, and is threaded into slide 8. With this arrangement, gauge element 14 can be vertically adjusted adjusted to a limited extent. From the front of slide 8 also protrudes a stop pin 86 which serves as a locating shoulder for gauge element 14. Thus, during installation in the comparator, the gauge element 14 can be firmly seated in locating contact with stop pin 86 before screw 84 is tightened down. This arrangement insures absolute accuracy of positioning of the gauge element 14 on slide 8.

During manufacture of the gauge elements 12, 14, it is relatively easy to machine the sides and ends of feet 72, 78 so that they are located with extreme accuracy relative to the threads on the gauge elements which contact the test piece during use of the comparator. Thus it may be appreciated that the locating pins 70, 86 and ribs 76, 77, 80, 82 in the slide and anvil provide convenient fixtures which insure excellent repeatability of the comparator reading even though the gauge elements may be interchanged or replaced during use of the comparator.

As the slide 8 is moved downwardly in the frame in response to depression of thumb piece 50 toward handle 2, the ball bearings 36, 38 will tend to roll downwardly in the grooves, carrying the cages 40, 42 with them. To allow this downward rolling movement of the ball bearings, the cages are resiliently supported at their lower ends by pins 90, 91 slidably supported in spring retainers 92, 93 carried in the lower ends of grooves 28, 30 and upwardly biased by compression springs 94, 95. The resilient support afforded the pins 90, 91 by spirngs 94, 95 permits a yielding downward displacement of the ball bearing cages 40, 42 when the movable slide is lowered by depression of thumb piece 50 so that the balls can roll freely in the grooves rather than slide. Thus wear of the balls and grooves is avoided. When thumb piece 50 is released, however, and movable slide 8 is returned to its uppermost position by the action of spring 56, the pins 90, 91 assist the cages and balls in overcoming gravity so that they can return completely to their uppermost position.

A flat cover plate 100 is secured to frame 4 by means of screws 102 threaded into tapped holes spaced along the side rails 20, 22. The cover plate is provided with an oblong aperture 104 as shown in Figure 2 to permit the gauge elements 12, 14 and protruding ribs 76, 77, 80, 82 to extend forwardly therethrough and to permit ready access to the screws 74, 84 which secure the gauge elements to the slide and the anvil respectively.

As will be apparent, with the construction above described the gauge elements can be simply and easily removed and replaced at any time without disassembling any of the remainder of the comparator merely by removing the screws 74, 84, pulling out the gauge elements, inserting a new set in properly located position abutting the stop pins 70, 86 and ribs 76, 77, 80, 82, and replacing the screws 74, 84. Excellent repeatability of readings is insured by the locating action of pins 70, 86, which are not disturbed during exchange or replacement of gauge elements.

It is a particular feature of the present invention that the provision of the elongated and comparatively wide movable slide 8, the long and comparatively widely spaced grooves in the slide and frame for accommodating the ball bearings 36, 38 to support the slide in accurate alignment with its axis of movement, and the pin 86 and ribs 80, 82 supporting the gauge element 14, permits easy and smooth movement of the slide in response to light forces on the thumb piece, while insuring that the movable gauge element will always be accurately aligned with the fixed gauge element without any danger of cocking or tilting, thus providing a sturdy and rugged instrument of improved accuracy and dependability, and long life. Also the extensive provision of flat locating and contacting surfaces throughout the comparator renders it particularly suitable for ease of manufacture and assembly.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

We claim:

1. In an internal thread gauging comparator, a channel-shaped frame open at its front, a longitudinally movable gauge support in said frame having a longitudinally extending flat front face, a fixed gauge support in said frame having a flat front face coplanar with the front face of said movable gauge support, a pair of longitudinally extending laterally spaced forwardly projecting ribs and a longitudinally facing locating shoulder on each of said front faces, a removable L-shaped gauge element carried by each of said gauge supports having an elongate foot received between the pair of ribs thereon and engageable at one end with the locating shoulder thereon, detachable means securing said gauge elements to said gauge supports, longitudinally extending bearing races in said frame on opposite sides of said movable gauge support, and a row of ball bearings between each of said races and said movable gauge support.

2. In an internal comparator, a channel-shaped frame, a pair of parallel longitudinal race members supported from the inner sides of said frame and having opposed parallel V-shaped longitudinal grooves, an elongate slide member adapted to be supported for longitudinal sliding movement in said frame, said slide member having V-shaped grooves in the sides thereof parallel to and confronting said grooves in said race members, a row of ball bearings in each pair of confronting inner and outer grooves slidably supporting said slide member in said frame, elongate cage members disposed in each pair of confronting grooves for supporting said ball bearings in spaced relation, spring means supporting said cage members for yielding excursion along said grooves with said slide member, an anvil member supported in said frame in longitudinal alignment with said slide member, coplanar flat front faces on said slide member and anvil member, a pair of laterally spaced longitudinally extending locating ribs on each of said front faces, forwardly projecting pins on said anvil and slide forming longitudinally facing locating shoulders on said front faces, cooperative gauging elements adapted to seat on the respective front faces of said anvil and slide, each of said gauging elements having an elongate longitudinally extending flat foot received between the pair of ribs on its front face and engageable at its end with the pin thereon, and detachable means securing said gauging elements in said position.

3. In an internal thread gauging comparator a channel-shaped frame open at the front, a fixed gauge support at one end of said frame having a flat front face, an oblong movable gauge support slidable relative to said fixed gauge support longitudinally of said frame and having a flat front face coplanar with the front face of said fixed gauge support, longitudinally extending bearing races in the frame on opposite sides of said movable gauge support, a row of ball bearings between each of said bearing races and said movable gauge support, an elongate bearing cage for each row of ball bearings, means resiliently biasing said bearing cages away from said fixed gauge support, spring means biasing said movable gauge support away from said fixed gauge support, a pair of laterally spaced longitudinally extending locating shoulders and a longitudinally facing locating shoulder on each of said front faces, cooperative L-shaped gauge elements mounted on said respective front faces, each of said gauge elements having a forwardly projecting gauging portion and a longitudinally extending foot received between said laterally spaced shoulders and engaged with said longitudinally facing shoulder, and detachable means securing said gauge elements in seated relation on said front faces.

References Cited in the file of this patent

UNITED STATES PATENTS

| | | |
|---|---|---|
| 1,281,805 | Metzger et al. | Oct. 15, 1918 |
| 1,625,462 | Frauenthal | Apr. 19, 1927 |
| 2,422,775 | Conner | June 24, 1947 |
| 2,427,924 | Rose | Sept. 23, 1947 |

FOREIGN PATENTS

| | | |
|---|---|---|
| 287,519 | Great Britain | Nov. 22, 1928 |
| 808,890 | Germany | July 19, 1951 |